Jan. 16, 1962     C. A. BAER ET AL     3,016,873
COATING
Filed Jan. 26, 1959
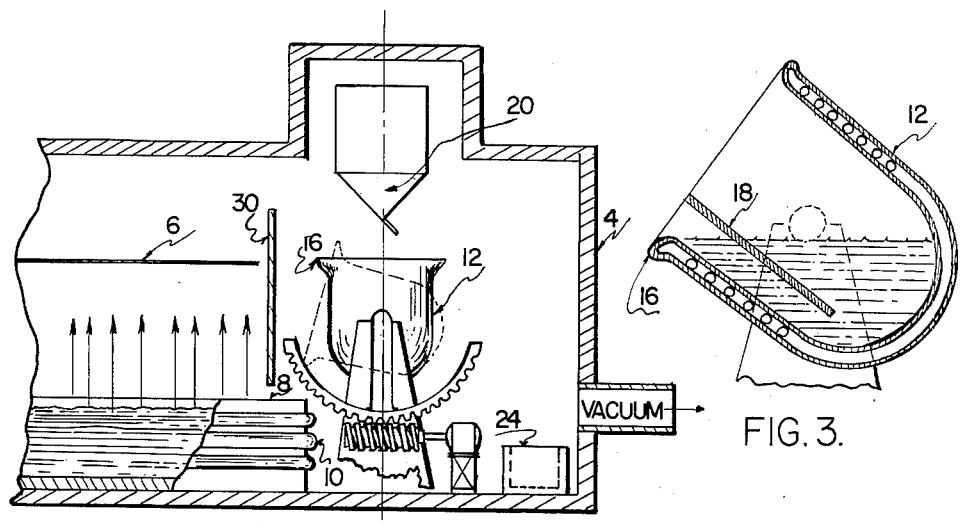
FIG. 1.
FIG. 3.
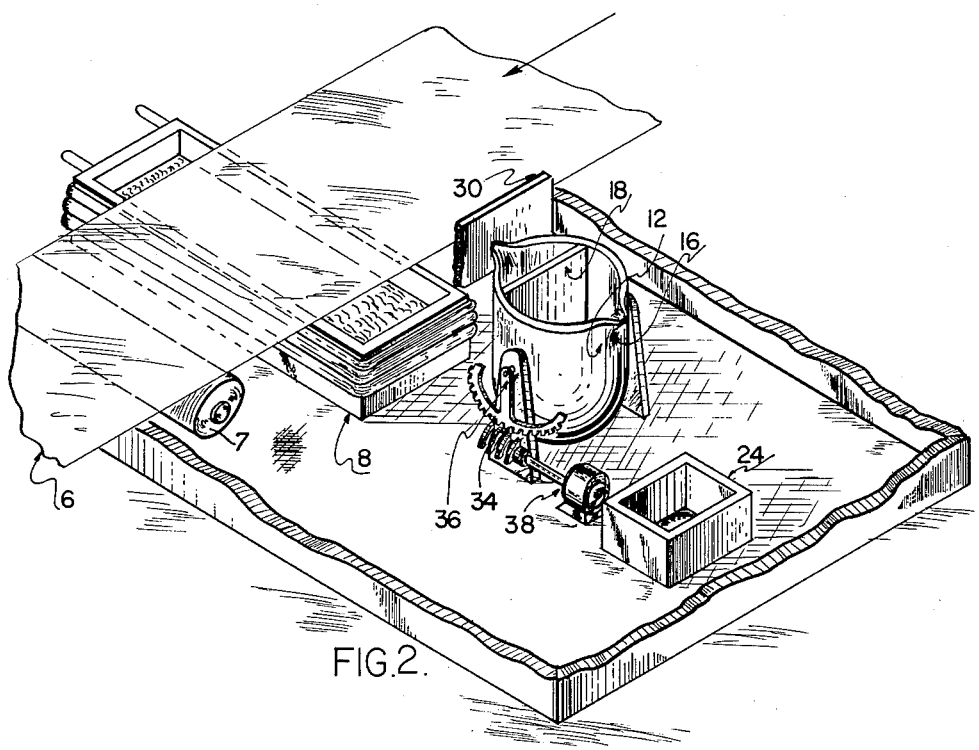
FIG. 2.

United States Patent Office 3,016,873
Patented Jan. 16, 1962

3,016,873
COATING
Charles A. Baer, Needham, Philip J. Clough, Reading, and Robert W. Steeves, Nahant, Mass., assignors, by mesne assignments, to National Research Corporation, Cambridge, Mass., a corporation of Massachusetts
Filed Jan. 26, 1959, Ser. No. 789,016
4 Claims. (Cl. 118—49.1)

This invention relates to vacuum coating. More specifically, this invention relates to apparatus adapted to supply coating vapors such as aluminum in the continuous or semicontinuous coating of substrates such as paper, plastic and metal.

In large scale vacuum deposition coating, it is desirable to have a coating vapor source which is replenished in order to permit coating over extended periods of time, with minimum interruption of vacuum conditions.

Accordingly, it is an object of the present invention to provide an improved process and apparatus for vacuum coating substrates with aluminum vapors.

Further objects are to improve the stability of vapor generation and decrease the vacuum pumping requirements of the coating chamber.

Other objects of this invention will, in part, be obvious and will, in part, appear hereinafter. The invention accordingly comprises the processes involving the several steps and the relation and the order of one or more of such steps with respect to each of the others and the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings wherein:

FIGURE 1 is a diagrammatic, schematic, fragmentary, partially sectional side view of one embodiment of the invention;

FIGURE 2 is a schematic partially cut away isometric view of a portion of FIGURE 1; and FIGURE 3 is a cross-sectional elevation of the melting pot portion of the preferred embodiment of FIGURE 1.

For convenience the invention will be initially described in connection with its use for coating a substrate with aluminum. In the apparatus of the present invention there is a usual vacuum coating chamber which can be evacuated to pressures in the micron Hg range. An evaporating crucible means for holding molten aluminum and evaporating the aluminum is provided with a suitable heating means. Guide rolls are adapted to pass a moving substrate over the crucible means so that aluminum vapors are condensed on the substrate. A melting pot adapted to receive solid aluminum and to melt it is arranged to pour molten aluminum into said crucible in such a manner that the evaporating conditions at the surface of the crucible are not substantially altered by the pouring.

According to the invention it has been found that operation of coating apparatus over extended intervals is greatly enhanced by eliminating oxides of aluminum from the vapor source.

It appears that oxides of aluminum are detrimental to the coating operation when present in the aluminum being vaporized. In addition to attacking the crucible material and affecting the vaporization rate, at the vaporizing temperature, gases are produced from reactions involving the aluminum oxides such as production of incondensible oxides of carbon, which affect the ambient vacuum.

In the invention, aluminum is melted and maintained in molten condition at a temperature of around 1000° C. initially. At this temperature, most of the oxide rises to the surface of the melt in a scum and is not dissolved in the melt itself. A bottom pour method is used by which the melt is drawn from beneath the surface of the melt in the melting pot and thereby the oxides and other floating scum remain in the melting pot after substantial quantities of molten aluminum are withdrawn. Pouring is terminated prior to pouring of the scum. Thus only a substantially pure aluminum melt is removed from the melting pot. This scum-free aluminum is thus introduced to the evaporating crucibles.

In a preferred embodiment, the melted metal is distributed to one or more boat-type crucibles, permitting periodic return of the melting pots from a pouring to a recharge melting position, without interruption of the coating operation.

Referring now to the drawings wherein like numerals refer to like elements, the details of construction and operation of the invention will be described.

In FIGURE 1 there is a vacuum chamber 4 equipped with a vacuum pump adapted to maintain pressures in the micron range, i.e., .1 to 10 micron Hg abs. A means is provided for introducing a substrate 6 into said chamber to expose it to coating vapors and for removing the substrate from the chamber after coating. The substrate preferably passes through conventional seals of the type described in Stoll Patent 2,384,500 when entering and leaving this chamber. Within the coating chamber there is a crucible means 8. Guide rolls, one which is shown schematically at 7, guide the substrate 6 as it passes over the crucible 8. The crucible means 8 is surrounded by a heating means shown as a coil 10 adapted to heat aluminum to vaporizing temperatures of about 1300° C. The aluminum vapors impinge upon the substrate 6 passing over the crucible. A melting pot 12 is adapted to be maintained at about 1000° C. and is provided with a pouring lip 16. A charging means 20 is located so that it discharges to the melting pot in the vacuum chamber.

Referring also to FIGURE 3, the melting pot 12 is provided with a vertical imperforate dividing plate 18 which is securely attached internally to the sides of the pot and extends from the top down into the cavity of the pot, ending short of the bottom of it. The pouring lip 16 is so located in the melting pot that when the melting pot is tipped, for instance as shown in FIGURE 3, melted aluminum in the melting pot flows over the pouring lip. The dividing plate 18 and the pouring lip 16 are so positioned with respect to each other and with respect to the entire melting pot that substantial portions of the melted material in the melting pot must pass below the dividing plate 18 in passing from the cavity of the melting pot to the pouring lip, with surface scum on the melt being restrained by the dividing plate. Means (not shown) are provided for removing the scum from the surface of the melt.

A shield 30 (see FIGURES 1 and 2) is preferably provided to protect the coating area from thermal radiation from the pouring operation.

In utilizing the invention, solid aluminum is introduced to the melting pot 12 from the charging means 20 and the melting pot is brought up to a temperature of around 1000° C., so that the aluminum is melted. After melting, the melting pot is tilted by a tipping means schematically indicated as a curved rack 34, pinion 36 and drive motor 38 (see FIGURE 2). The molten aluminum flows into the crucible 8 where it is heated to about 1300° C., and is vaporized, coating the substrate.

As the molten aluminum in crucible 8 is evaporated, a gentle stream, sustaining the level of molten aluminum in the crucible is maintained by incremental tipping of the melting pot. By this means the controlled tipping of the melting pot 12 gives a controlled feed to the crucible 8.

Because of the dividing plate 18, the major portion of the scum on the surface of the molten aluminum is restrained. Tilting is stopped while the bottom of the divider 18 is still submerged. Thereafter scum is removed by, for instance, tilting the melting pot in the opposite direction to dump the scum into receptacle 24. The melting pot is returned to its vertical position, and another batch of aluminum is melted and tipping resumed.

Where a multiplicity of crucibles are used as a source for vapors in the coating, a launder is preferably provided between the melting pot and the crucibles for distributing the molten metal from the melting pot to the crucibles, as is shown in the copending application of Albert Eng of equal date.

The melting pots and other containers for aluminum maintained around 1000° C. can be of amorphous carbon with outer insulation of alumina and clay. The crucibles may be of carbonaceous material such as graphite, machined to form the desired cavity, and having a coating of zirconium carbide or the like.

Though this invention has particular utility in continuous operations where the substrate flows continuously from a production line, it is also advantageously used as a semicontinuous coater wherein large amounts of molten aluminum are consumed. The invention has been described relating to aluminum vapor deposition but has utility in other coating applications. Since many variations on this basic apparatus can be accomplished within the spirit of the invention, it is intended that the description and drawings herein be taken in a descriptive and not limiting sense.

What is claimed is:

1. A coating apparatus comprising a vacuum chamber capable of being evacuated to the micron range, an elongated crucible for containing metal to be evaporated, a means for heating said crucible, means for passing a substrate above said crucible forming a coating area in which the substrate is to be coated with vapors emanating from said crucible, a melting pot located above said crucible and adapted to be emptied into an end of said crucible, means for tilting said melting pot at a controlled rate, means for heating said melting pot to a temperature above the melting point of aluminum, said melting pot comprising a cup formed of material not reactive with molten aluminum at 1000° C., a pouring lip located on one edge of the top of said cup, and a separating member adjacent the top of the melting pot dividing the surface area of melt therein into a small portion adjacent to the pouring lip and a large portion on the other side of said separating member whereby on tilting of the melting pot in pouring, scum which is on the surface of the liquid in the large portion of the cup is restrained from being poured over said lip, and a baffle provided to shield the coating area from radiations from the melting pot and from that portion of the crucible in which the molten aluminum is poured.

2. A coating apparatus comprising a vacuum chamber capable of being evacuated to the micron Hg abs. range, an elongated crucible for containing metal to be evaporated, a means for heating said crucible, means for passing a substrate above said crucible for the purpose of coating it with vapors emanating from said crucible, a rotatably mounted melting pot located above said crucible and adapted to be emptied into said crucible, means for feeding aluminum containing oxide to said pot, means for tilting said melting pot at a controlled rate, means for heating said melting pot to a temperature above the melting point of aluminum, said melting pot comprising an inner surface formed of material not reactive with molten aluminum at 1000° C., a pouring lip located adjacent the top of said pot and a separating member adjacent the top of the melting pot dividing the surface area of melt therein into a small portion adjacent to the pouring lip and a large portion on the other side of said separating member to which the feeding means is adapted to feed whereby most of the aluminum oxide can be confined in a surface scum on said large portion of surface and whereby on tilting of the melting pot in pouring the melt most of the melted material must pass beneath said member thereby preventing pouring of said surface scum.

3. The apparatus of claim 2 wherein the crucible means has a substantial volume permitting the melting pot to be at least occasionally returned during the coating operation to its charging position without interruption of vapor generation from said crucible.

4. A coating apparatus comprising a vacuum chamber, means for evacuating said chamber to the micron Hg abs. range, means for passing a substrate through said chamber and vaporizing means located in a coating position below said substrate, said vaporizing means comprising a boat-type crucible having an oblong shape and enclosing a similar cavity, said boat-type crucible extending across the width of the substrate passing above, an induction heating coil positioned closely around said boat and a replenishing means comprising at least one melting pot located at an end of and above said boat, said melting pot comprising an inner surface constructed of material neutral to melted aluminum at 1000° C., an outer insulation, a pouring lip, a pot divided provided to cause surface scum to be retained in said melting pot, a tilting means for tilting said melting pot and means for introducing solid metal to be melted into said melting pot whereby metal to be vaporized can be melted from the solid form and poured into the evaporating crucible so as to maintain a given level in said crucible, said tilting means including controls for regulating the rate of tilt of the melting pot so the melted metal will be so introduced into said crucible that evaporating conditions in said crucible are not substantially altered during the introduction of said newly melted metal.

References Cited in the file of this patent
UNITED STATES PATENTS

| | | |
|---|---|---|
| 2,020,101 | Brown | Nov. 5, 1935 |
| 2,664,852 | Chadsey | Jan. 5, 1954 |
| 2,822,301 | Alexander et al. | Feb. 4, 1958 |